United States Patent [19]

Takata et al.

[11] Patent Number: 4,714,299
[45] Date of Patent: Dec. 22, 1987

[54] BRAKE PRESSURE CONTROL SYSTEM

[75] Inventors: Koji Takata; Yukinori Nishiyama, both of Itami, Japan

[73] Assignee: Sumitomo Electric Industries, Limited, Japan

[21] Appl. No.: 605,790

[22] Filed: May 1, 1984

[30] Foreign Application Priority Data

May 10, 1983 [JP] Japan .................. 58-82968
May 30, 1983 [JP] Japan .................. 58-97499

[51] Int. Cl.⁴ .................. B60T 8/58; B60T 8/64; B60T 11/00; B60T 8/44
[52] U.S. Cl. .................. 303/100; 188/345; 188/181 A; 303/111; 303/114
[58] Field of Search ............ 188/345, 359, 182, 195, 188/181 A, 181 C; 303/111, 103, 105, 116, 119, 114, 104, 22 R, 23 R, DIG. 1-4, 93-95, 97, 100; 60/547.1, 549

[56] References Cited

U.S. PATENT DOCUMENTS

| 3,433,536 | 3/1969 | Skinner | 303/DIG. 4 |
| 3,473,850 | 10/1969 | Lawrie | 303/99 |
| 3,768,874 | 10/1973 | Riordan | 303/111 |
| 3,832,012 | 8/1974 | Bourgoin | 188/345 X |
| 4,022,514 | 5/1977 | Kondo et al. | 303/119 X |
| 4,230,375 | 10/1980 | Leiber | 303/105 |
| 4,312,543 | 1/1982 | Kubota | 303/119 X |
| 4,414,630 | 11/1983 | Harris et al. | 303/104 X |
| 4,418,966 | 12/1983 | Hattwig | 303/119 X |
| 4,508,393 | 4/1985 | Drometer | 303/111 |

FOREIGN PATENT DOCUMENTS 1384310 2/1975 United Kingdom .................. 303/111

Primary Examiner—Andres Kashnikow
Assistant Examiner—Robert J. Oberleitner
Attorney, Agent, or Firm—Harness, Dickey & Pierce

[57] ABSTRACT

An improved brake pressure control system for vehicles is proposed which employs a brake pressure detecting means, wheel speed sensors and a data processor for antilocking control, booster control and distribution of brake force. The control system regulates braking pressure to insure maximum or nearly maximum brake effectiveness under all operating conditions.

12 Claims, 6 Drawing Figures

BRAKE PRESSURE CONTROL SYSTEM

BACKGROUND OF THE INVENTION

The present invention relates to the improvement of a brake pressure control system for motor vehicles including an electronic data processor such as a microprocessor and an antilocking device.

In a brake pressure control system for automobiles, the use of an antilocking device, boosters and control valves for distribution of brake force are known.

An antilocking device is designed to detect or foresee the wheels locking and remove or relax the brake pressure. It generally includes detectors for detecting the speed of rotation of the wheels, an electronic data processor such as a microprocessor (hereinafter referred to as a "processor") and a brake pressure controller. The signals from the wheel speed detectors are given to the processor, which, when it detects or foresees the wheels locking from change in the wheel speed, gives an antilocking control signal to the brake pressure controller, which adjusts the brake pressure so that the wheels will not lock. The antilocking device assures stability and controllability of the vehicle at sudden braking.

The booster is designed to amplify the brake operating force applied by the driver. Conventional boosters are of a purely mechanical construction to amplify the force applied by the driver to the brake for a brake pressure common to two brake pressure lines. Recently, it has been proposed to utilize electronic control technology for this booster to control directly the braking force itself (and thus the resultant deceleration) from the brake operating force by the driver, not simply to amplify the brake pressure proportionately according to the brake operating force.

Further, it is known as "ideal distribution of brake force" to distribute the brake force to the front and rear wheels so as to minimize the occurrence of the wheel locking. In order to achieve the ideal brake force distribution approximately, it has been proposed to interpose a brake pressure control valve or an proportional valve. For this purpose, various types of control valves are proposed. Also, various load-responsive types have been devised because the ideal brake force distribution depends on the loading conditions.

In case of 4-wheel vehicles, if the rear wheels locked before the front ones did, the vehicle could lose directional stability. This is dangerous. Therefore, distribution of brake force is usually set to be somewhat more front-effective than the ideal distribution. This puts more burden on the front wheel brakes. So the friction members for the front brakes have to be larger in size than those for the rear brakes. Particularly if disk brakes are used for the front wheels and drum brakes are used for the rear wheels, what is called a metering valve (a kind of brake pressure control valve) is sometimes used to retard the pressure increase for the front brakes, thereby equalizing the degree of wear of friction members of front and rear wheels.

In conventional brake pressure control systems, a pressure adjusting unit for antilocking control, a booster controller and a control valve for distribution of brake force are provided separately. This makes the construction of the brake pressure control system complicated.

An object of the present invention is to provide a brake pressure control system which has a brake pressure controller adapted for antilocking control, for booster control, and for distribution of the brake force.

SUMMARY OF THE INVENTION

In accordance with one aspect of the present invention, there is provided a brake pressure control system for a vehicle comprising a detecting means for detecting the speed of rotation of wheels of the vehicle, a data processing means receiving signals from said detecting means to detect or foresee the locking of the wheels from the change in said signal and giving an antilock control signal, and brake pressure control means receiving said antilock control signal to control the brake pressure for the wheels, said data processing means computing a desirable distribution of brake force to the front and rear brakes and generating a brake pressure control signal as a result of computation even if the locking of the wheels is not detected or foreseen, said brake pressure control means receiving said brake pressure control signal to achieve said desired ratio of distribution.

In accordance with another aspect of the present invention, there is provided a brake pressure controller for use with a brake system having a first brake pressure line and a second brake pressure line, said controller comprising a first control means having a first pressure-receiving portion communicating with said first brake pressure line and a second pressure-receiving portion communicating with said second brake pressure line for controlling the sum of a thrust acting on said first pressure-receiving portion and a thrust acting on said second pressure-receiving portion, and a second control means having a third pressure-receiving portion communicating with said first brake pressure line and a fourth pressure-receiving portion communicating with said second brake pressure line for controlling the difference between a thrust acting on said third pressure-receiving portion and a thrust acting on said fourth pressure-receiving portion.

The first control means serve to control the brake force for the entire brake system and the second control means serve to control the distribution of brake force into the first and second brake pressure lines. Also, by controlling the sum and difference by means of the first and second control means, respectively, these two brake pressure lines can be controlled independently.

Thus, it is possible to give a desired brake force corresponding to the operating force by the driver by means of the first control means and give a desired brake force distribution by means of the second control means. Also, by giving proper signals from the data processor to the first and second control means, the brake pressure for one brake pressure line only can be reduced for anti-locking control.

BRIEF DESCRIPTION OF THE DRAWINGS

Other objects and features of the present invention will become apparent from the following description taken with reference to the accompanying drawings, in which.

DETAILED DESCRIPTION OF THE PREFERRED EMBODIMENTS

Figure 1:
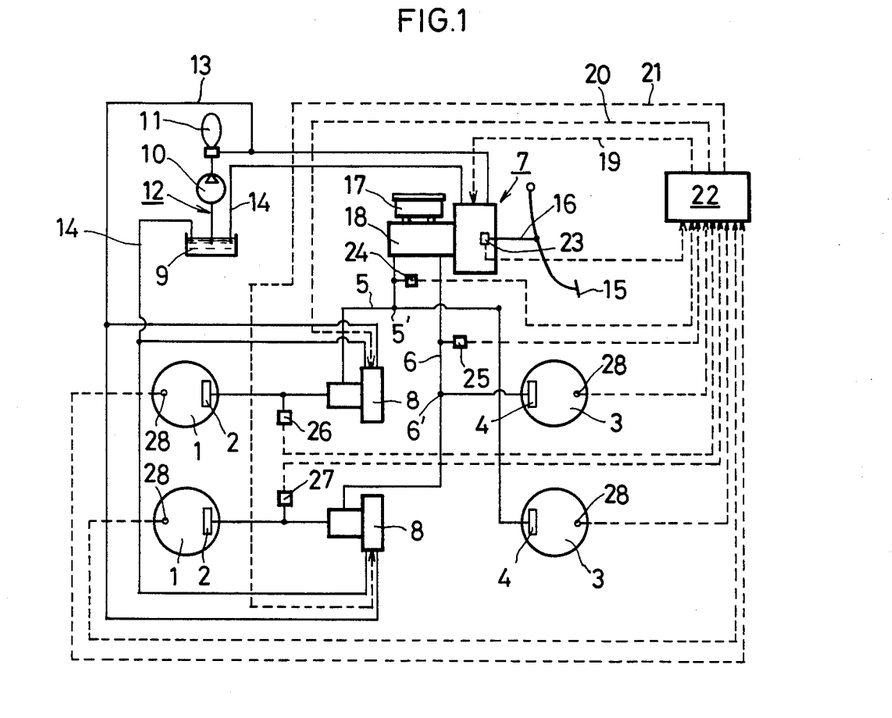
FIG. 1 is a piping diagram of a brake pressure control system embodying the present invention.

Referring to FIG. 1 illustrating a brake pressure control system for a four-wheel vehicle embodying the present invention, it includes brakes 2 for front wheels 1 and brakes 4 for rear wheels 3. The front brakes 2 and diagonally connected to the rear brakes 4 through brake pressure lines 5 and 6. These pipe lines are connected to a master pressure controller 7. Subcontrollers 8 are provided between the front brakes 2 and junction points 5', 6' in the lines 5, 6. These controllers 7 and 8 are connected to a high-pressure line 13 and a low-pressure line 14 of a power source 12 including a fluid tank 9, a hydraulic pump 10 and an accumulator 11.

An input shaft 16 actuated by a brake pedal 15 is mechanically coupled to the master controller 7. A pressure generator 18 having a reservoir tank 17 for braking fluid is connected to the output side of the master pressure controller 7. The sum of the power from the power source 12 and the stepping force applied to the brake pedal 15 acts on the pressure generator 18, which generates the required brake pressure.

The controllers 7 and 8 are connected through electrical circuits 19, 20 and 21 to a data processor 22, which gives the controllers control signals (for antiskidding and brake force distribution) to control the power acting on the controllers 7 and 8, thereby changing the brake pressures. The master pressure controller 7 controls the brake pressure for the whole braking system and the subcontrollers 8 control the brake pressures for the respective front brakes 2 independently.

The input shaft 16 is provided with a detector 23 for the pedal stepping force; the pipe lines 5, 6 are provided with detectors 24, 25 for the initial pressure and detectors 26, 27 for the pressures to the front brakes, respectively; the front wheels 1 and the rear wheels 3 are provided with a wheel rotation speed detector 28. These detectors 23-28 are connected to the data processor 22 through electrical circuits to send the detection signals to the data processor.

In the above-described brake pressure control system, the brake force is distributed to the front and rear brakes in the following manner.

Figure 2:
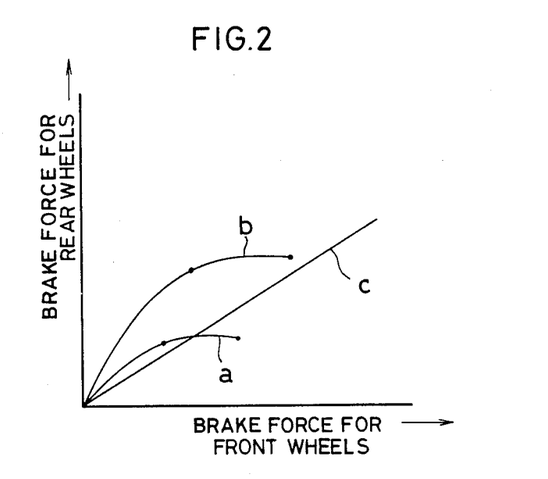
FIG. 2 is a graph showing ideal distributions of brake force in different conditions.

In FIG. 2, the curve a is the ideal brake pressure distribution curve under a lightly laden state; the curve b is that under the fully laden state; the straight line c shows the distribution when the brake power source has failed.

Distribution approximate to the ideal brake force distribution can be computed when the following are known, i.e. the total vehicle weight under a given laden state, the ratio of distribution of the total vehicle weight onto the front and rear wheels when the vehicle is at standstill, and the ratio of height of center of gravity with respect to the wheel base. Thus, regarding the former ratio and the latter ratio as constants specific to the vehicle or functions depending on only the total vehicle weight, the ideal ratio of brake force distribution can be computed if only the total vehicle weight is known. Further, the total vehicle weight can be computed from the detected brake pressures for the front and rear brakes and the deceleration actually obtained if the effectiveness coefficients of the front and rear brakes are estimated at suitable values. Direct measurement of the total vehicle weight improves the control accuracy, of course. But, this requires a sensor and makes the system expensive.

Actually, the effectiveness coefficient varies in a complicated manner with the speed, temperature and history. But, even if it is assumed to be a constant, the brake force distribution obtained by computation is approximate to the ideal brake force distribution. Practically this does not raise a serious problem.

Once the ideal brake force distribution has been computed, the required ratio between the brake pressures for the front and rear brakes can be computed approximately by estimating the effectiveness coefficients of the front and rear brakes from the deceleration actually obtained at a given point of time.

The deceleration used for these computations may be detected by use of a deceleration sensor provided specifically for this purpose. But, this increases the cost of the system. Therefore, the wheel speed sensor provided to detect or foresee the locking of the wheels may be used to detect the deceleration for lower cost.

By giving the results thus obtained by computation to the master pressure controller 7 and the subcontrollers 8 as the pressure control signals, the required distribution of brake force can be achieved approximately.

Figure 6:
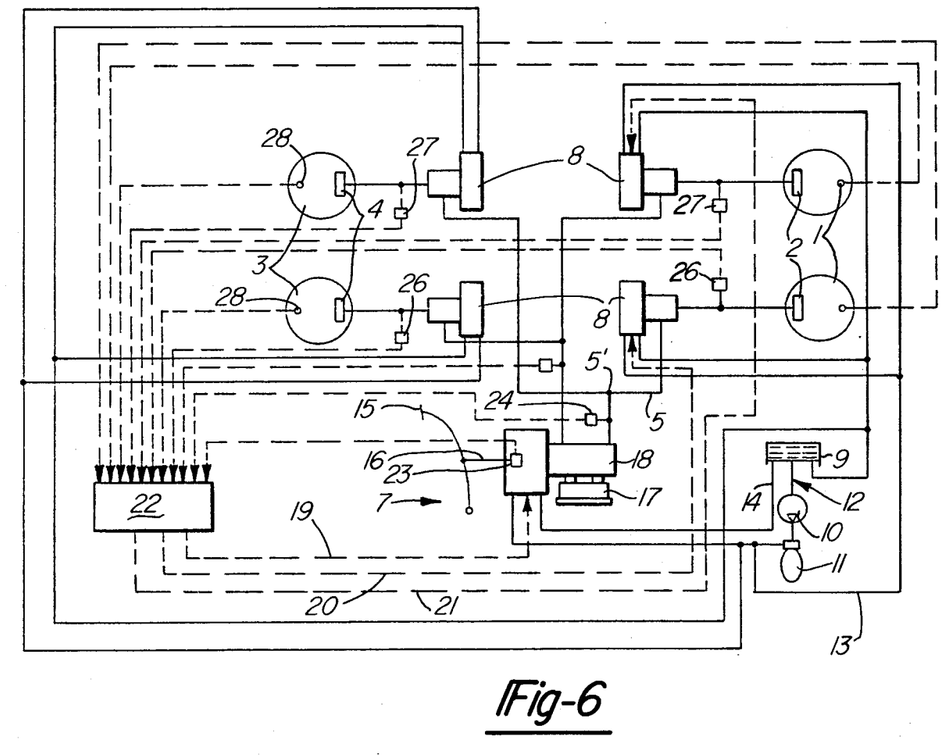
FIG. 6 is a sectional view of another embodiment of the invention.

FIG. 6 shows another embodiment of the invention wherein there are provided master pressure controllers 7 and sub-controllers 8 between both the front and rear wheel brakes so that the pressure to all four wheels may be controlled.

Instead of using the detected brake pressures for the front and rear brakes for computation, the brake forces for the vehicles detected by means of brake force detectors may be used. This would decrease the degree of approximation and permit attaining the ideal distribution because the effectiveness coefficients of the brakes does not have to be assumed. It may be decided which should be used for computation, the brake pressures or the brake forces, taking the cost and the required performance into consideration.

If the actually detected deceleration were used for computation from the start of braking, excessive brake pressure might be supplied because the rise of deceleration usually comes some time after the rise of brake pressure. In order to avoid this, it is preferable to memorize a relatively stable relationship between the brake pressure and the deceleration in the last or past braking, estimate a deceleration from the detected brake pressure on the basis of the memorized relationship, and use the estimated deceleration for computation instead of the actual deceleration.

In order to lighten the burden on the front brakes so as to equalize the degree of wear of the friction members used on the front and rear brakes, the brake force distributed to the front brakes may be set to a smaller value than in the ideal distribution in the low deceleration (brake pressure) range.

The line c in FIG. 2 shows a proper distribution of the brake force when the power source 12 has failed. In the ideal brake force distributions in the normal state (shown by curves a and b in FIG. 2), the rear brakes are set to be more effective than the front brakes in comparison with the case where the power source has failed. In other words, the brake pressure is reduced for the front brakes and is increased for the rear brakes in most of the ranges in the normal state in comparison with the case where the power source fails.

For the above-mentioned reason, controllers adapted to perform pressure reduction only (corresponding to the subcontrollers 8 in the embodiment) may be used for the front brakes while the master pressure from the master pressure controller 7 may be supplied directly to the rear brakes.

Next, the antilock control in the abovesaid brake pressure control system will be described below.

When the driver steps the brake pedal 15 so powerfully that excessive brake force has been applied to the wheels, the data processor 22 will receive the signals from the wheel speed detectors 28, detect or foresee the wheels locking, and give the control signals to the master pressure controller 7 and/or the subcontrollers 8.

Figure 3:
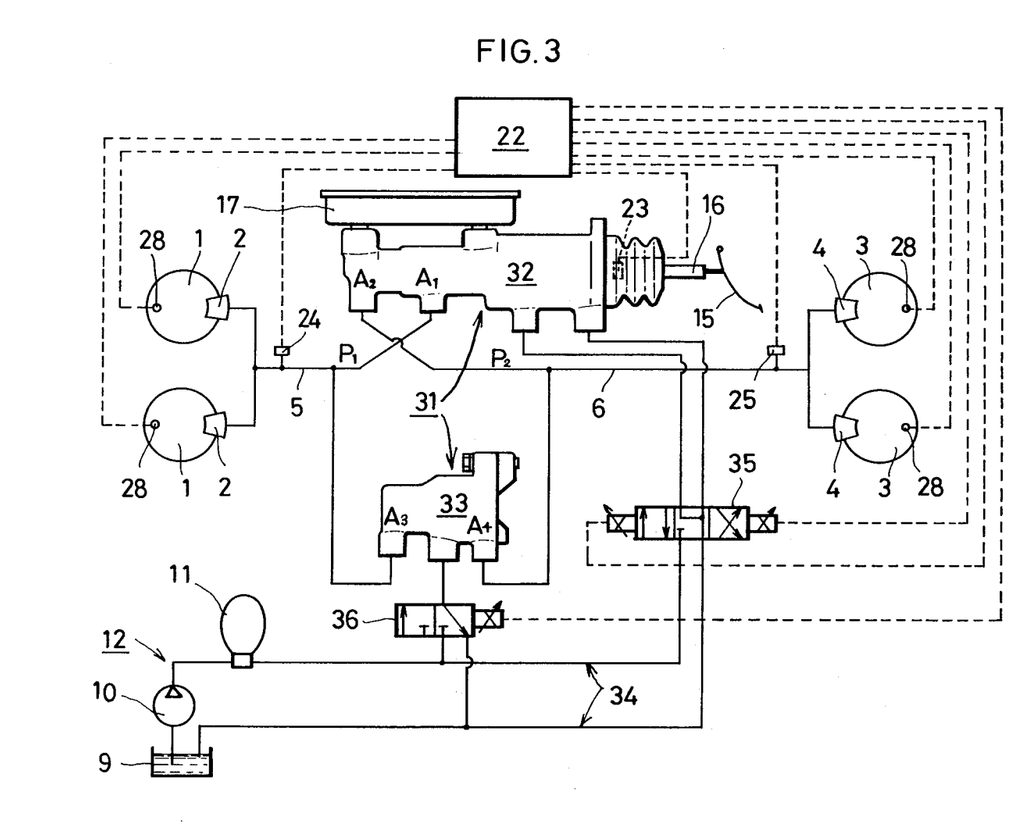
FIG. 3 is a piping diagram of another brake pressure control system.

Next, referring to FIG. 3, it illustrates another brake pressure control system for a 4-wheel vehicle. It includes a brake pressure controller 31 which comprises a first control unit 32 and a second control unit 33. The first control unit 32 has a reservoir tank 17 for the brake fluid. To the first control unit 32, a first brake pressure line 5 having the brakes 2 for the front wheels 1 and a second brake pressure line 6 having the brakes 4 for the rear wheels 3 are connected independently. To the input side of the first control unit 32 are connected power lines 34 which are connected to high-pressure and low-pressure sides of the power source 12 which includes the fluid tank 9, the hydraulic pump 10 and the accumulator 11. On the way to the first control unit 32, a pressure control valve 35 of a current proportional control type is interposed. The valve 35 is electrically connected to the data processor 22. The valve 35 receives the control signal from the data processor 22 to switch the direction of supply of power and control the magnitude of power.

To the input side of the first control unit 32, the input shaft 16 actuated by the brake pedal 15 is mechanically coupled. The first control unit 32 is driven by the stepping force applied to the brake pedal 15 and the power assist force supplied from the power lines 34.

Assuming that the pressures of the first and second brake pressure lines 5 and 6 are $P_1$, and $P_2$, respectively and that the effective pressure-receiving areas of the pistons are $A_1$ and $A_2$, the sum F of the thrust can be expressed as follows:

$$F = A_1P_1 + A_2P_2 \quad (1)$$

The sum F of the thrust approximately affects the brake force for the entire brake system.

Also, assuming that the stepping force for the brake pedal 15 is $F_O$ and the power assist force supplied from the power lines 34 is $F_A$, $$F = F_O + F_A \quad (2)$$

If the power source 12 has failed the following is true, $$F = F_O$$

With a control system of a type in which the piston is entirely separated from the input shaft, $F = F_A$ in the normal state and $F = F_O$ when the power source has failed. The present invention is also applicable to such a type.

Next, the second control unit 33 will be described. The output side of the unit 33 is connected to the first and second brake pressure lines 5 and 6 and its input side is connected to the power source 12 through a pressure control valve 36 of a current proportional control type which is connected to the data processor 22. The pressure control valve 36 performs the same functions as the control valve 35.

Assuming that the pressure-receiving areas of the second control unit 33 for the first and second brake pressure lines 5 and 6 are $A_3$ and $A_4$, respectively, the power force D supplied from the power source 12 can be expressed as follows:

$$D = A_4P_2 - A_3P_1 \quad (3)$$

This power force D governs distribution of brake force to the brake pressure lines 5 and 6. The valve D can be set to be sometimes positive and sometimes negative. But, by selecting the parameters suitably, it may be set to be always positive or always negative. This simplifies the construction of the second control unit 33.

As described above, the output sides of the first and second control unit 32 and 33 are connected to both the first and second brake pressure lines 5 and 6. Thus, the brake pressure as shown below acts on the first brake pressure line 5:

$$P_1 = \frac{A_4F - A_2D}{A_1A_4 + A_2A_3} \quad (4)$$

Also, the pressure acting on the second brake pressure line 6 is expressed by:

$$P_2 = \frac{A_3F + A_1D}{A_1A_4 + A_2A_3} \quad (5)$$

Therefore, by controlling the control valve 35 for the first control unit 32 and the control valve 36 for the second control unit 33 from the processor 22 to adjust the values F and D of the brake force, the brake pressures for the brake pressure lines 5 and 6 can be adjusted at will.

In FIG. 3, pressure detectors 24, 25 for the first and second brake pressure lines 5, 6, a detector 23 for the stepping force on the brake pedal, detectors 28 for detecting the speed of rotation of the wheels 1, 3 are all connected electrically to the data processor 22 to send the detection signals to it.

Next, the first and second control units 32, 33 will be described in detail with reference to FIG. 4.

The first control unit 32 has a fluid pressure booster 46 combined with a master cylinder 47. A piston 48 of the booster 46 is aligned with a piston 49 of the master cylinder 47, and they are coupled to each other by a pin 50.

A cylinder 51 of the booster 46 is partitioned by the piston 48 into two chambers 52 and 53 which communicate with the power source 12 (FIG. 3) through ports 54, 55, respectively. The power assist force from the power source 12 adjusted to a desired magnitude is applied to a suitable side of the piston 48.

The input side end of the piston 48 projects outwardly from a body 56 of the booster 46. Its projecting portion is formed with a bore to receive the input shaft 16 with its round end pivotally coupled to the piston 48. The projecting portion of the piston 48 is covered by a boot 59.

A cylinder 60 of the master cylinder 47 is formed with a shoulder 61 to form a large-diameter (first brake pressure) annular chamber 62 and a small-diameter (second brake pressure) chamber 63. The piston 49 has a large-diameter portion 64 and a small-diameter portion 65 which fit the chambers 62 and 63, respectively. These two chambers 62,63 communicate through holes 66,67 with ports 68,69 of the reservoir tank 17, and with ports 70,71 of the first and second brake pressure lines 5 and 6.

The small-diameter portion 65 of the piston 49 is formed with a bore 72 to receive a hat-like shaped spring support 73. A spring 75 is supported between the support 73 and another spring support 74 provided at the end of the second chamber 63 to urge the piston 49. A valve rod 76 has one end engaging the end of one spring support 73 and the other end received in the other spring support 74. The valve rod 76 is biased by a spring 77 supported between the inner surface of the spring support 74 and the enlarged end of the valve rod 76. A valve member 78 provided at the end of the valve rod 76 is disposed near a hole 67 leading to the port 69.

Figure 4:
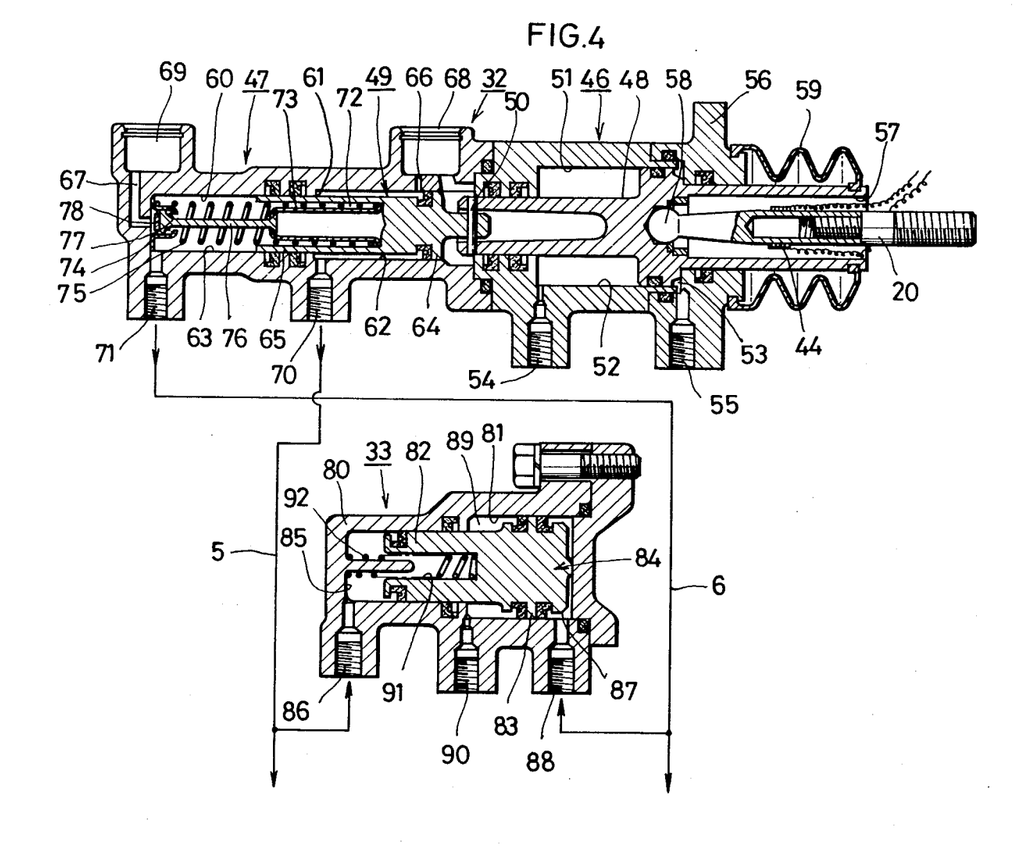
FIG. 4 is a sectional view of a brake pressure controller used in the control system, said controller having a first control unit and a second control unit.

When the piston 49 moves leftwardly in FIG. 4, the valve rod 76 moves with the piston 49 so that the hole 67 is closed by the valve member 78. Thus, fluid pressure develops in the second brake pressure chamber 63. As the piston 49 moves, the hole 66 in the first chamber 62, too, will be blocked so that fluid pressure develops in the first chamber 62.

Now, when the brake pedal stepping force $F_O$ and the thrust $F_4$ from the power source act on the booster 46, the piston 48 advances. Thus, the piston 49 in the master cylinder 47, too, advances so that its large-diameter portion 64 and small-diameter portion 65 cause fluid pressure to develop. Expressing the pressure-receiving area of the large-diameter portion as $A_1$ and that of the small-diameter portion as $A_2$ and the pressures for the first and second brake pressure lines as $P_1$ and $P_2$, respectively, the above-mentioned formula (1) and (2) hold.

Next, the second control unit 33 will be described below. It has a body 80 formed with a cylinder 81 having a shoulder to receive a piston 84 which has a small-diameter portion 82 and a large-diameter portion 83. To the left of the small-diameter portion 82 is formed a third brake pressure chamber 85 which communicates with the first brake pressure line 5 through a port 86. To the right of the large-diameter portion 83 is formed a fourth brake pressure chamber 87 which communicates with the second brake pressure line 6 through a port 88. To the other side of the large-diameter portion 83 is formed a power pressure chamber 89 which communicates with the power source 12 through a port 90.

The small-diameter portion 82 is formed at its end with a bore 91 to receive a spring 92 to urge the piston 84. Expressing the pressure-receiving area of the small-diameter portion as $A_3$, that of the large-diameter portion as $A_4$ and the power force from the power source 12 as D, the above-mentioned formula (3) holds.

Figure 5:
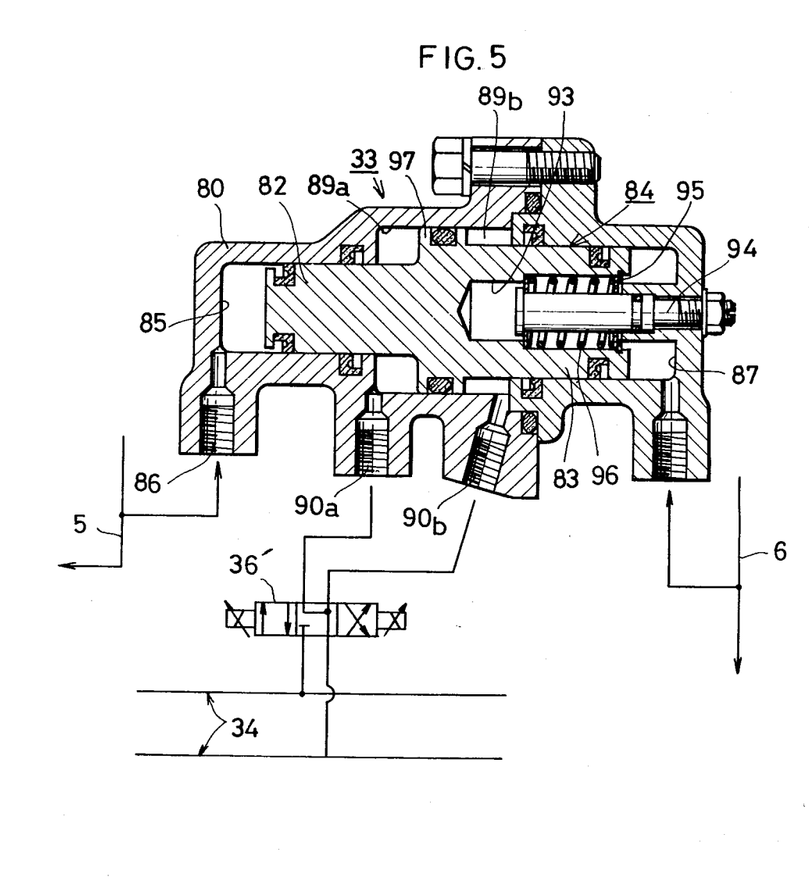
FIG. 5 is a sectional view of another embodiment of the second control unit.

FIG. 5 shows another embodiment of the second control unit 33 in which a flange 97 on the piston 84 partitions the power pressure chamber 89 into two chambers 89a and 89b which communicate with the power source 12 through ports 90a, 90b, a pressure control valve 36' of a current proportional control type, and the power lines 34. Thus, the pressure from the power source 12 is adapted to be applied on the flange 97 from its suitable side. This embodiment of the second control unit 33 works in the same manner as its first embodiment described before.

The large-diameter portion 83 of the piston is formed with a bore 93 to receive a spring support rod 94 secured to the body 80. A spring 96 is mounted on the rod 94 with its one end held on a ring 95 to bias the piston 84.

In the brake control system (FIG. 3) including the brake pressure controller 31, by giving the brake stepping force and the power forces from the brake power source 12, the pressures $P_1$, $P_2$ shown by formula (4) and (5) are supplied to the front and rear brakes 2, 4 through the first and second brake pressure lines 5, 6, respectively. These pressures $P_1$ and $P_2$ are controlled according to the circumstances by the control valves 35, 36 or 36' which receive from the data processor 22 signals for brake force distribution, those for the magnification of stepping force, or those for antilocking.

In the brake control system of FIG. 3, the front brakes 2 are governed by one brake pressure line 5 and the rear brakes 4 are governed by the other line 6. However, the present invention is also applicable to a brake control system of the so-called diagonal type in which e.g. the right front brake and the left rear brake are governed by one pressure line and the left front brake and the right rear brake are governed by another line. However, because the present invention has a marked effect in the distribution of brake force to the front and rear brakes, it should preferably be applied to the so-called FR type in which the front brakes and the rear brakes are governed by two separate lines as in the present embodiment or to the so-called IH type in which part of the front brakes are governed by one pressure line and the remainder of the front brakes and both of the rear brakes are governed by another pressure line.

As described before, the distribution of brake force to the front and rear brakes is controlled in the normal state so as to be slightly front-effective than in the ideal distribution, to compensate for the variation in the friction coefficient of the friction members, etc.

However, the friction members of the front brakes tend to wear more rapidly than those of the rear brakes because on ordinary vehicles the brake force required for the front brakes is larger in most of the situations than that required for the rear brakes. Therefore, it is preferable to control the distribution of brake force so as to be more rear-effective than in the ideal distribution, thereby equalizing the wear of the friction members of the front and rear brakes.

If the brake power source 12 has failed, the distribution of brake force becomes fixed. Thus, it has to be preset properly. In view of the fact that even in the failure of the power source, if a large stepping force is applied to the brake pedal, a considerably large deceleration can occur and that the failure of the power source can occur while the vehicle is running on a road having a low friction coefficient, the distribution of brake force in the failure of power source should be fixed to be as front-effective as possible for safety's sake, as shown in FIG. 2 by the line C. This prevents the rear wheels from locking. If the distribution is set in such a manner, the ratio of brake pressure for the front wheels to that for the rear wheels is smaller in the normal state than in the failure of power source.

However, because the frequency of use is naturally much higher in the normal state than in the failure, it is preferable to set so that the brake pressure for the front wheels will be substantially equal to that for the rear wheels in the normal state. If so set, the former will be larger than the latter in the failure of power source. In the second embodiment shown in FIG. 3, it is so set. However, in the first embodiment shown in FIG. 1, the former will be substantially equal to the latter even in the failure of power source.

While the power source is in failure, the formula (3) will be $$D = A_4 P_2 - A_3 P_1 = 0$$

Thus, $$P_1/P_2 = A_4/A_3$$

Therefore, $A_3$ and $A_4$ may be determined so that a desired ratio $P_1/P_2$ will be obtained in the failure of power source. Since $P_1 > P_2$ is desired in the failure of power source, $A_3 < A_4$ naturally results.

If the distribution of brake force in the failure of power source is set to be more front-effective than any ratio of distribution required in the normal state, the second control unit 33 may be such a single-effective type as the one shown in FIG. 4. This type is simpler in construction than the type shown in FIG. 5. However, if the brake circuit for the rear wheels fails so that no pressure develops in the brake pressure line 6, there will be no force for moving the piston 84 leftwardly. Therefore, the amount of fluid required for the front wheels has to be assured by the volume of the second chamber 63 of the master cylinder 47. If its volume is insufficient, the more complicated type as shown in FIG. 5 has to be used.

Next, the pedal stroke in the normal state and in the failure of power source will be considered below. In order to maintain the feeling of braking, the pedal stroke should correspond to the required amount of fluid. Particularly if the brake system is controlled so that not the stepping force vs. brake pressure but the stepping force vs. deceleration will be kept at a desired constant relationship, it is only the pedal stroke that can be detected as a response from the brake system. All the more for this reason, it is desirable that the pedal stroke is proportional to the required amount of brake fluid.

In view of power magnification function by the booster 46, the pedal stroke may be rather short in the normal state even if the power assist force required for the first control unit 32 becomes large. In the failure of the power source, the pedal stroke could be as long as allowable whereas the pedal stepping force should be reduced as much as possible.

This will be accomplished by setting the ratio of $A_1/A_2$ ($A_1$, $A_2$ pressure-receiving areas of the first control unit) to be smaller than $C_1/C_2$ ($C_1$, $C_2$: brake force for unit fluid pressure for the front and rear wheels. This ratio is substantially equal to the ratio of sectional areas for the brake cylinder on a brake of the same type).

For, in connection with the formula (1), the entire brake force B can be expressed as follows:

$$B = C_1 P_1 + C_2 P_2 \quad (6)$$

Thus, the ratio B/F should be set to be rather small in the normal state and to be large in the failure of power source.

For, $$\frac{B}{F} = \frac{C_1 P_1 + C_2 P_2}{A_1 P_1 + A_2 P_2} = \quad (7)$$

$$\frac{(C_1 + C_2)\left\{\frac{C_1}{C_1 + C_2} \times \left(\frac{P_1}{P_2} - 1\right) + 1\right\}}{(A_1 + A_2)\left\{\frac{A_1}{A_1 + A_2} \times \left(\frac{P_1}{P_2} - 1\right) + 1\right\}}$$

$$\frac{C_1}{C_1 + C_2} > \frac{A_1}{A_1 + A_2} \quad (8)$$

If set to satisfy the formula (8), the larger the ratio $P_1/P_2$, the larger the ratio B/F will be.

Any electrical or electronic elements used in the embodiment may be replaced with optical elements corresponding to them.

What is claimed is:

1. A brake pressure control system for a vehicle having a hydraulically operated front brake and a hydraulically operated rear wheel brake, a brake pedal actuable by an operator, and hydraulic means for operating said front and rear brake means upon operation of said brake pedal, comprising;

said hydraulic means including brake pressure control means for electronically controlling the brake pressure of said front wheel brake and said rear wheel brake independently of each other;

pedal force detecting means for measuring the amount of force applied to said brake pedal;

wheel speed detecting means for detecting the rotational speed of each of the wheels;

brake pressure detecting means for detecting the brake line pressure controlled by said brake pressure control means;

and data processing means for giving signals to said brake pressure control means and being programmed (1) for controlling the deceleration of the vehicle calculated with information obtained by said wheel speed detecting means according to a desired deceleration calculated with the information obtained by said pedal force detecting means;

(2) to relieve and restore the brake pressure to avoid a wheel lock condition when a potential wheel lock is sensed on the basis of the information obtained by said wheel speed detecting means; and (3) to control the distribution of brake pressure between said front wheel brake and said rear wheel according to an ideal distribution computed with presupposed effectiveness coefficient of said brakes, the brake pressure detected by said brake pressure detecting means and the deceleration computed from said wheel speed detecting means when a potential wheel lock condition is not sensed.

2. The brake pressure control system as claimed in claim 1, wherein said distribution of brake force between the front wheel brake and the rear wheel brake is more rear-effective than a computed ideal distribution in the low deceleration range.

3. The brake pressure control system as claimed in claim 1, wherein said distribution of brake force between the front wheel brake and the rear wheel brake is also computed by use of the detected speed of rotation of the wheels.

4. The brake pressure control system as claimed in claim 1, wherein the deceleration of the vehicle used for computation is an estimated deceleration rather than of the actual deceleration at least at the initial stage of each braking, said estimated deceleration being estimated from a brake pressure-deceleration relationship memorized from previous brakings.

5. The brake pressure control system as claimed in claim 1, wherein said distribution of brake force between the front and rear wheel brakes is computed taking into consideration detected vehicle weight.

6. The brake pressure control system as claimed in claim 1, wherein said distribution of brake force between the front and rear wheel brakes is computed by use of the brake force detected by brake force detectors provided on the wheels, and the deceleration of the vehicle.

7. A brake pressure control system for a vehicle as claimed in claim 1, wherein said brake pressure control means comprises a master pressure controller and subcontrollers both controlling the brake pressure according to the signals given by said data processing means, said master controller controlling the pressure of said rear wheel brake and also the input pressure of said subcontrollers, each of said subcontrollers controlling the pressure of each of a respective one of said front brakes based on the pressure controlled by said master controller.

8. A brake pressure controller for use with a brake system having a first brake pressure line for supplying pressure to a first wheel brake and a second brake pressure line for supplying pressure to a second wheel brake, said controller comprising a first control means selectively operable by an operator and having a first pressure-receiving portion communicating with said first brake pressure line for supplying fluid pressure thereto and a second pressure-receiving portion communicating with said second brake pressure line for supplying fluid pressure thereto, means for controlling the sum of a thrust acting on said first pressure-receiving portion and a thrust acting on said second pressure-receiving portion in relation to the operator input and to a sensed condition for varying the thrust acting for a given operator input to prevent an undesired braking condition, and a second control means having a third pressure-receiving portion communicating with said first brake pressure line and a fourth pressure-receiving portion communicating with said second brake pressure line and means for varying the relative pressure supplied by said second control means to said first and second brake pressure lines for controlling the difference between a thrust acting on said third pressure-receiving portion and a thrust acting on said fourth pressure-receiving portion.

9. The brake pressure controller as claimed in claim 8, wherein one of said first brake pressure line and said second brake pressure line is connected to the front-brakes and the other of said brake pressure lines is connected to the rear brakes, said second control means controlling the difference between a thrust of the one brake pressure line acting on a smaller pressure-receiving area and a thrust of the other brake pressure line acting on a larger pressure-receiving area.

10. The brake pressure controller as claimed in claim 8, wherein one of said first brake pressure line and said second brake pressure line is connected to the front brakes and the other of said brake pressure lines is connected to the rear brakes, the ratio of a pressure-receiving area communicating with one brake pressure line to a pressure-receiving area communicating with the other brake pressure line in said first control means being smaller than the ratio of a brake force generated per unit area by said one brake pressure line to a brake force generated per unit area by said other brake pressure line.

11. The brake pressure controller as claimed in claim 8, wherein said second control means function so as to reduce the pressure for one brake pressure line and increase the pressure for the other brake pressure line.

12. A brake pressure control system for a vehicle having a hydraulically operated front brake and a hydraulically operated rear wheel brake, a brake pedal actuable by an operator, and hydraulic means for operating said front and rear brake means upon operation of said brake pedal, comprising;

said hydraulic means including brake pressure control means for electronically controlling the brake pressure of said front wheel brake and said rear wheel brake independently of each other;

pedal force detecting means for measuring the amount of force applied to said brake pedal;

wheel speed detecting means for detecting the rotational speed of each of the wheels;

brake pressure detecting means for detecting the brake line pressure controlled by said brake pressure control means;

and data processing means for giving signals to said brake pressure control means and being programmed (1) for controlling the deceleration of the vehicle calculated with information obtained by said wheel speed detecting means according to a desired deceleration calculated with the information obtained by said pedal force detecting means;

(2) to relieve and restore the brake pressure to avoid a wheel lock condition when a potential wheel lock is sensed on the basis of the information obtained by said wheel speed detecting means; and (3) to control the distribution of brake pressure between said front wheel brake and said rear wheel brake according to an ideal distribution computed with presupposed effectiveness coefficient of said brakes, the brake pressure detected by said brake pressure detecting means and the rotational speed of the wheel detected by said wheel detecting means when a potential wheel lock condition is not sensed.

* * * * *